(12) United States Patent
Nakano (10) Patent No.: US 6,545,732 B2
(45) Date of Patent: Apr. 8, 2003

(54) BACKLIGHT ASSEMBLY FOR LIQUID CRYSTAL DISPLAY DEVICE

(75) Inventor: Hiroyuki Nakano, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 268 days.

(21) Appl. No.: 09/759,164

(22) Filed: Jan. 16, 2001

(65) Prior Publication Data

US 2001/0010568 A1 Aug. 2, 2001

(30) Foreign Application Priority Data

Jan. 27, 2000 (JP) .................................... 2000-018476
May 30, 2000 (JP) .................................... 2000-160820

(51) Int. Cl.$^7$ ........................................... G02F 1/1335
(52) U.S. Cl. .............................. 349/58; 349/65; 362/31
(58) Field of Search ............................. 349/58, 60, 61, 349/62, 65; 362/31

(56) References Cited

U.S. PATENT DOCUMENTS

| | | | | |
|---|---|---|---|---|
| 5,537,296 A | * | 7/1996 | Kimura et al. | 362/31 |
| 5,558,420 A | * | 9/1996 | Oki et al. | 362/31 |
| 6,425,673 B1 | * | 7/2002 | Suga et al. | 362/31 |
| 6,480,245 B1 | * | 11/2002 | Sakamoto et al. | 349/59 |

* cited by examiner

*Primary Examiner*—James Dudek
(74) *Attorney, Agent, or Firm*—Oblon, Spivak, McClelland, Maier & Neustadt, P.C.

(57) ABSTRACT

A backlight assembly for a liquid crystal display device comprising lamp units each including a lamp reflector, a lamp portion attached within the lamp reflector and lamp rubbers provided on both ends of the lamp portion, and a frame for holding the lamp units. The lamp units are arranged to include means for maintaining a predetermined clearance between at least end portions of the lamp units and the frame. It is possible to easily perform assembly and exchange of lamp units and to further achieve improvements in reliability.

7 Claims, 9 Drawing Sheets

BACKLIGHT ASSEMBLY FOR LIQUID CRYSTAL DISPLAY DEVICE

BACKGROUND OF THE INVENTION

The present invention relates to a backlight assembly for a liquid crystal display device. More particularly, the present invention relates to a backlight assembly for a liquid crystal display device, the backlight assembly being used with an image display panel such as a liquid crystal display panel, in which it is possible to easily perform assembly and exchange of lamp units and in which it is further possible to achieve improvements in reliability.

Figure 8:
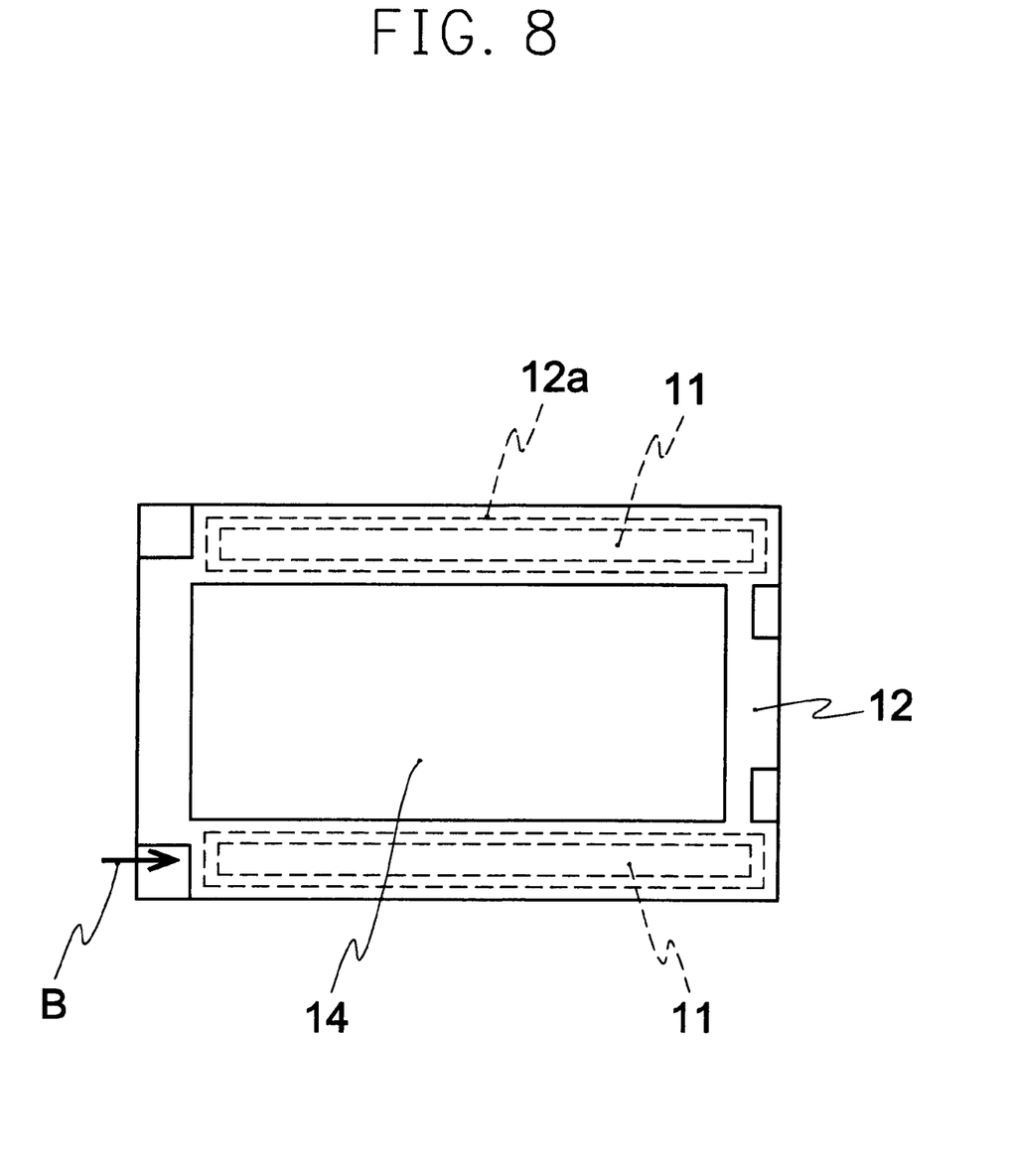
FIG. 8 is a plan view of a conventional backlight assembly for a liquid crystal display device.
Figure 9A:
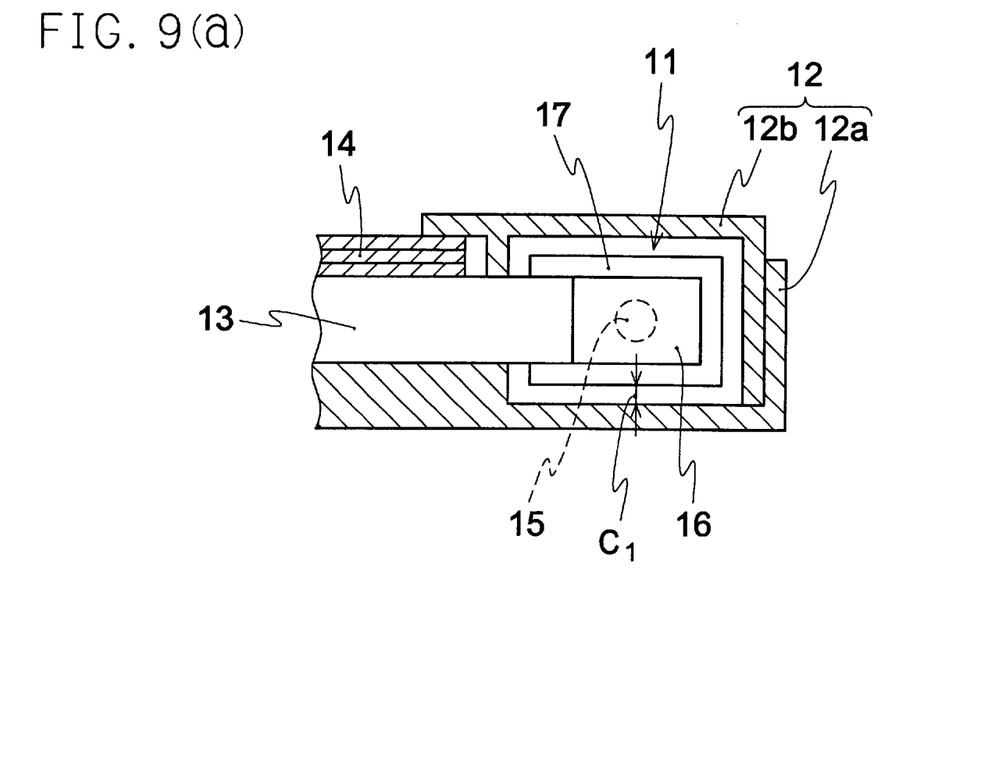
FIG. 9(a) is a partially enlarged sectional view when seen from a direction of an arrow B in FIG. 8.

A conventional backlight assembly for a liquid crystal display device shown in FIG. 8 and FIG. 9(a) which is a partial enlarged sectional view seen from a direction of an arrow B in FIG. 8, comprises lamp units 11 serving as light sources, a frame 12 for supporting these lamp units 11, a light-conducting plate 13 made of acrylic resin or the like and optical sheets 14 (diffusion sheet, lens sheet, reflecting sheet, etc.) which are overlapped onto both surfaces of the light-conducting plate 13. The frame 12 comprises a frame main body 12a and a supporting frame 12b laminated onto the frame main body 12a for supporting the lamp units 11 and peripheral portions of the optical sheets 14.

Figure 9B:
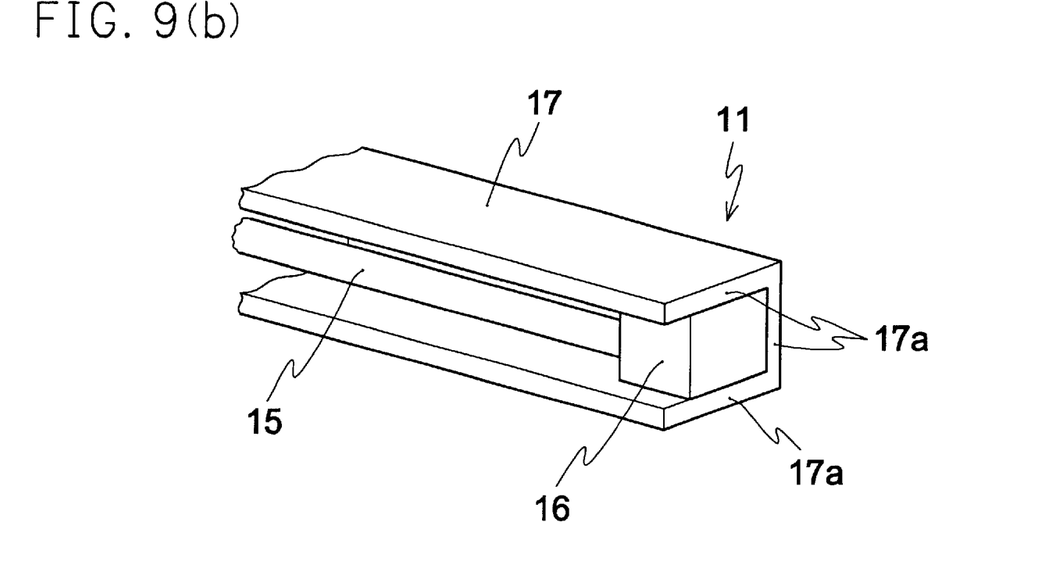
FIG. 9(b) is a perspective view including partially omitted portions.

As shown in FIG. 9(b) which is a perspective view of the lamp units 11 including partially omitted portions, each lamp unit 11 comprises a lamp reflector 17, a cold-cathode fluorescent lamp 15 attached within the lamp reflector 17 to serve as a light-emitting source, and lamp rubbers 16 provided on both ends of the cold-cathode fluorescent lamp 15.

In order to enable holding of the lamp units 11 by the frame 12 and easy insertion thereof, each lamp unit 11 is formed with a predetermined clearance $C_1$ over the entire outer periphery of the lamp reflector 17.

However, in the above-described arrangement of the conventional backlight assembly for a liquid crystal display device, unevenness is caused in the clearance $C_1$ between each lamp unit 11 and the frame 12 depending on methods for insertion, and it is difficult to maintain a predetermined clearance. Moreover, in the presence of projections (returns and burrs) at both end portions 17a of the lamp reflector 17 which are formed during processing and molding (see FIG. 9(b)), sliding of the lamp units 11 on the frame 12 will increase contact resistance between the end portions of the lamp reflector 17 and the frame main body 12a to thereby prevent smooth sliding of the lamp units 11. Consequently, there are presented drawbacks that deformations in the frame 12 or the lamp reflector 17 or generation of foreign matters within the lamp reflector 17 occur, and inconveniences in view of assembly and reliability are caused.

The present invention has been made with the aim of solving these problems, and it is an object thereof to provide a backlight assembly for a liquid crystal display device in which it is possible to easily perform assembly and exchange of lamp units and in which it is possible to achieve improvements in reliability.

SUMMARY OF THE INVENTION

In accordance with the present invention, there is provided a backlight assembly for a liquid crystal display device comprising lamp units each including a lamp reflector, a lamp portion attached within the lamp reflector and lamp rubbers provided on both ends of the lamp portion, and a frame for holding the lamp units, wherein the lamp units are arranged to include means for maintaining a predetermined clearance between at least end portions of the lamp units and the frame.

It is preferable that the predetermined clearance is approximately 0.1 to 10 mm.

It is preferable that a part of the lamp rubbers of the lamp units projects outward from the end portions of the lamp reflector along axial directions of the lamp reflector and a part of the projecting portions projects out from an outer peripheral surface of the lamp reflector.

It is preferable that at latest one projection is formed on the outer peripheral surface of the lamp reflector.

It is preferable that at least a tip end of the projection is formed in a rounded manner.

It is preferable that the projection is formed by drawing the lamp reflector.

It is preferable that portions which project in the axial direction of the lamp reflector and of which tip ends are folded back inward of the lamp reflector are formed at end portions of the lamp reflector.

BRIEF DESCRIPTION OF THE DRAWINGS

FIG. 7 (a) is a sectional view and FIG. 7(b) is a perspective view including partially omitted portions, each showing another example of a backlight assembly for a liquid crystal display device according to Embodiment 3 of the present invention;

DETAILED DESCRIPTION

Embodiments of the backlight assembly for a liquid crystal display device according to the present invention will now be explained in details with reference to the drawings.

The backlight assembly for a liquid crystal display device according to the present invention is a backlight assembly for a liquid crystal display device comprising lamp units each including a lamp reflector, a lamp portion attached within the lamp reflector and lamp rubbers provided on both ends of the lamp portion, and a frame for holding the lamp units, wherein the lamp units are arranged to include means for maintaining a predetermined clearance between at least end portions of the lamp units and the frame.

With this arrangement, when the lamp units are slid on the frame supporting these members for assembling the lamp units into the backlight assembly for a liquid crystal display device, the predetermined clearance can be maintained between at least end portions of the lamp units and the frame by means of projecting portions of the lamp rubbers and the like and the end portions of the lamp reflector will be prevented from contacting the frame. It is accordingly possible to exhibit the action of preventing generation of foreign matters and further preventing deformations in the lamp units and the frame. Similar effects might be exhibited when performing exchange or repair of the lamp units.

The predetermined clearance is preferably set to approximately 0.1 to 10 mm in view of processing or molding properties as well as tolerances.

The backlight assembly for a liquid crystal display device of the present invention will more concretely be explained by way of examples shown in Embodiments 1 to 3.

Embodiment 1

Figure 1:
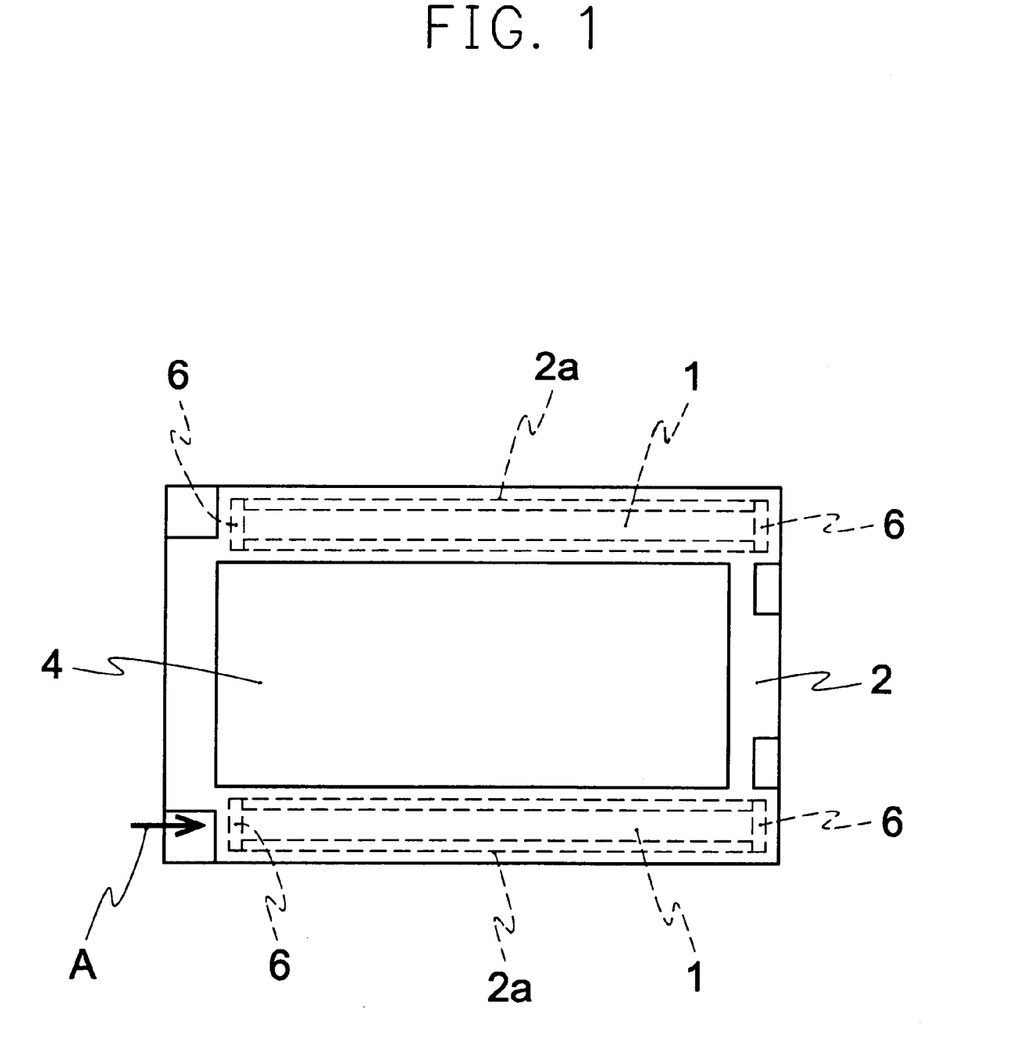
FIG. 1 is a planar explanatory view of a backlight assembly for a liquid crystal display device according to Embodiment 1 of the present invention.
Figure 2A:
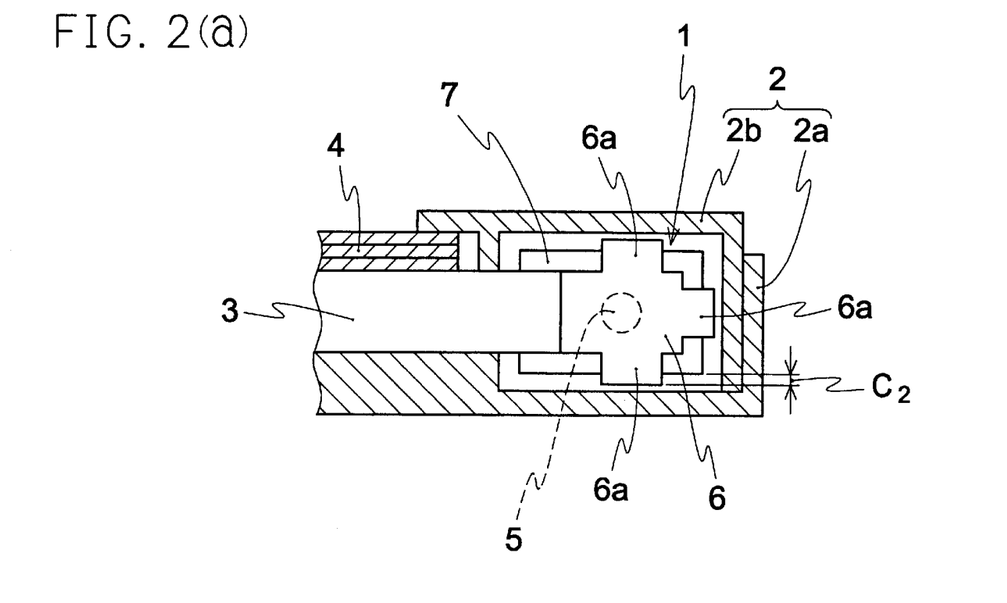
FIG. 2(a) is a partially enlarged sectional view when seen from a direction of an arrow A in FIG. 1.
Figure 2B:
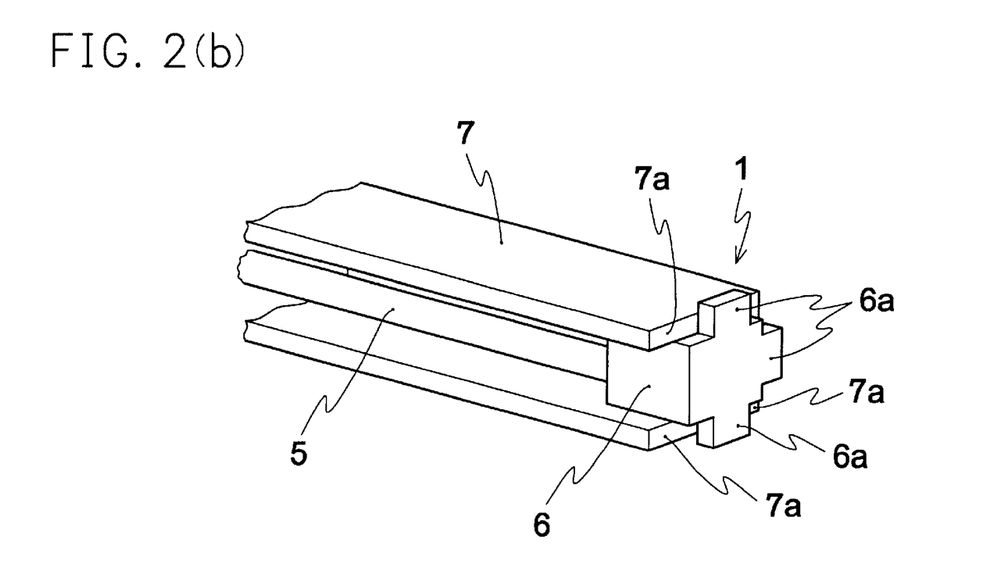
FIG. 2(b) is a perspective view including partially omitted portions.
Figure 3A:
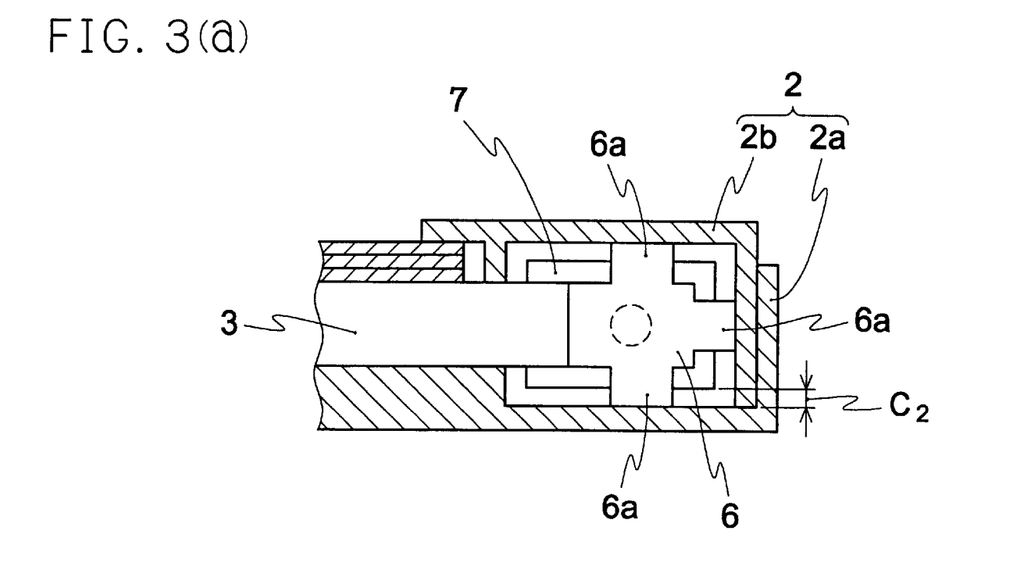
FIG. 3(a) is a partially enlarged sectional view and FIG. 3(b) is a perspective view including partially omitted portions, each showing another example of a backlight assembly for a liquid crystal display device according to Embodiment 1 of the present invention.
Figure 3B:
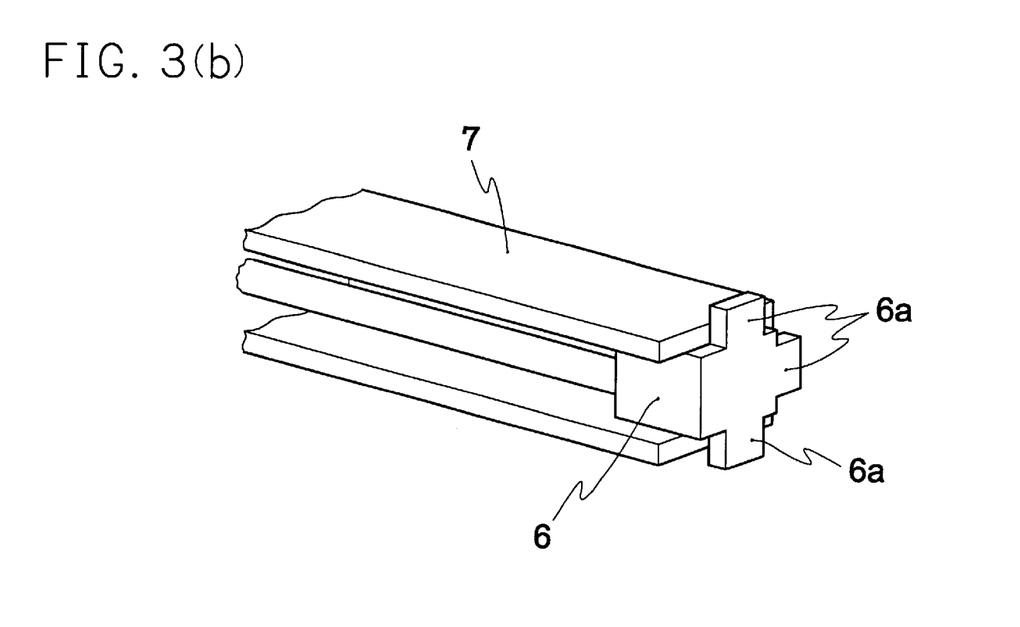

FIG. 1 is a planar explanatory view of a backlight assembly for a liquid crystal display device according to Embodiment 1 of the present invention; FIG. 2(a) is a partially enlarged sectional view when seen from a direction of an arrow A in FIG. 1, and FIG. 2(b) is a perspective view including partially omitted portions; and FIG. 3(a) is a partially enlarged sectional view, and FIG. 3(b) is a perspective view including partially omitted portions, each showing another example of a backlight assembly for a liquid crystal display device according to Embodiment 1.

In the backlight assembly for a liquid crystal display device according to Embodiment 1, by making lamp rubbers 6 project from end portions of a lamp reflector 7 as shown in FIG. 2, end portions of the lamp reflector 7 will no more contact the frame 2 during sliding so that it is possible to restrict occurrence of foreign matters. By downsizing the projecting portions of the lamp rubbers 6, contact areas with the frame 2 can be reduced to enable smooth sliding of the lamp units 1, thereby deformations in the frame 2 and the lamp units 1 can be prevented.

More particularly, the backlight assembly for a liquid crystal display device according to the present Embodiment 1 shown in FIGS. 1 and 2 comprises, as shown in FIG. 2, lamp units 1 including the lamp reflector 7, a lamp portion such as a cold-cathode fluorescent lamp which is attached within the lamp reflector 7, and the lamp rubbers 6 provided on both ends of the lamp portion 5. For maintaining a predetermined clearance $C_2$ between at least the end portions of the lamp units 1 and the frame 2, the lamp units 1 are so arranged that a part of the lamp rubbers 6 projects outward from the end portions of the lamp reflector 7 along axial directions of the lamp reflector 7, and out of these projecting portions, peripheral projections 6a projects from an outer peripheral surface of the lamp reflector 7.

Similarly to the conventional backlight assembly, the assembly further comprises a light-conducting plate 3 and optical sheets 4 (diffusion sheet, lens sheet, reflecting sheet, etc.) which are overlapped on both surfaces of the light-conducting plate 3. The frame 2 comprises a frame main body 2a and a supporting frame 2b laminated onto the frame main body 2a for supporting the lamp units 1 and peripheral portions of the optical sheets 4.

In the present Embodiment 1, when inserting the lamp units 1 which serve as light sources into the frame 2, the peripheral projections 6a of the lamp rubbers 6 largely projecting from the external shape of the lamp reflector 7 will first contact the frame 2, and while the lamp units 1 are sliding through the frame 2, the end portions 7a of the lamp reflector 7 will be inserted without contacting the frame 2, with being remote by at least the predetermined clearance $C_2$ (refer to FIG. 2(a)). The same applies when taking the lamp units 1 out from the frame 2 in case of performing exchange or repair of the lamp units.

While the lamp units 1 of the present Embodiment 1 are supported within the frame 2 by pinching open end portions of the lamp reflector 7 to both surfaces of the light-conducting plate 3, the present invention is not limited to this arrangement, and it is alternatively possible to set an amount of projection of the peripheral projections 6a large such that no clearance is formed between the peripheral projections 6a of the lamp rubbers 6 and the frame 2 as shown in FIGS. 3(a) and (b) for making the peripheral projections 6a contact the frame 2, and support might be provided by the peripheral projections 6a accordingly.

In such case, the lamp reflector 7 and the frame 2 will be even better prevented from contacting each other since the clearance $C_2$ might be secured to be larger than compared in FIG. 2(a), and assembly and exchange of lamp units might be performed in an easy manner.

Embodiment 2

Figure 4A:
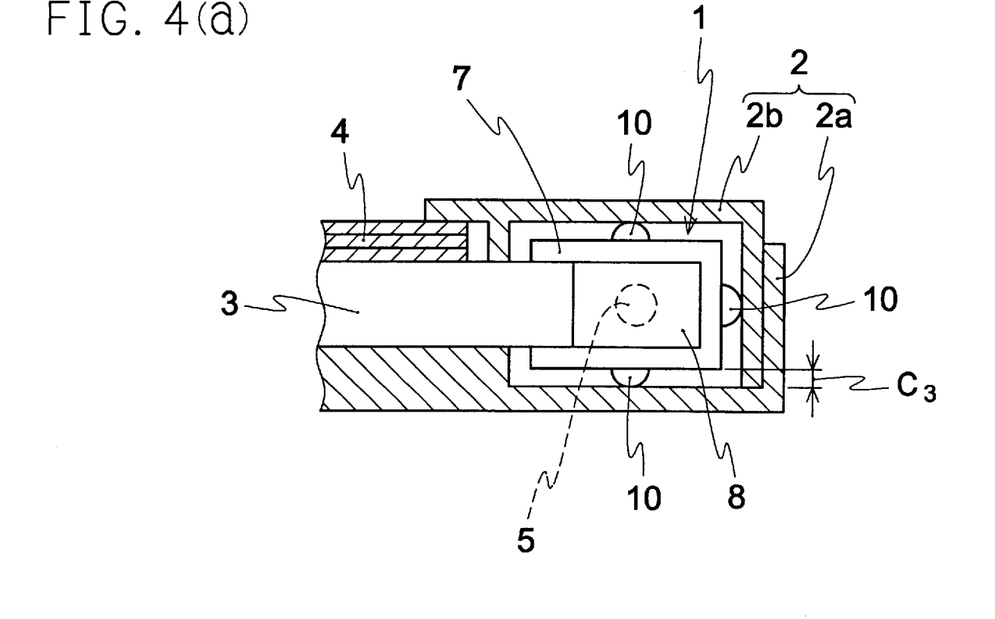
FIG. 4(a) is a sectional view and FIG. 4(b) is a perspective view including partially omitted portions, each showing a backlight assembly for a liquid crystal display device according to Embodiment 2 of the present invention.
Figure 4B:
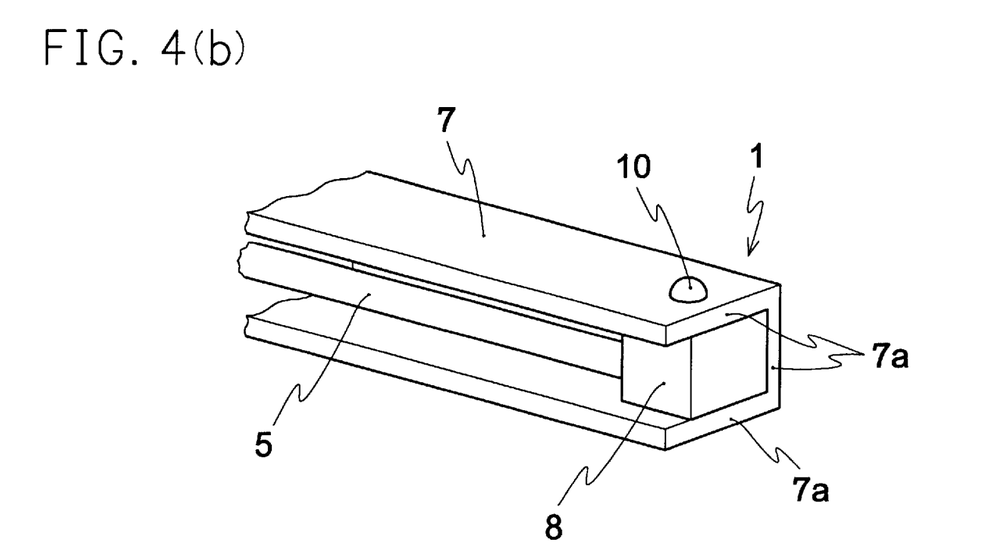

FIG. 4(a) is a sectional view and FIG. 4(b) is a perspective view including partially omitted portions, each showing a backlight assembly for a liquid crystal display device according to Embodiment 2 of the present invention.

As shown in FIG. 4, similar effects as those described above might be achieved by providing smooth projections 10 on outer peripheral surfaces of the lamp reflector 7 for securing a predetermined clearance $C_3$ between the lamp units 1 and the frame 2 during sliding so as to prevent contact between end portions of the lamp reflector 7 and the frame 2.

More particularly, the backlight assembly for a liquid crystal display device according to the present Embodiment 2 comprises, as shown in FIG. 4, lamp units 1 including a lamp reflector 7, a lamp portion 5 such as a cold-cathode fluorescent lamp attached within the lamp reflector 7, and lamp rubbers 8 provided on both ends of the lamp portion 5. The lamp units 1 have at least one projection 10 on outer peripheral surfaces of the lamp reflector 7 for maintaining a predetermined clearance $C_3$ between at least end portions 7a of the lamp units 1 and the frame 2. The remaining arrangements are similar to those of the above-described backlight assembly of FIG. 2.

In the present Embodiment 2, when inserting the lamp units 1 which serve as light sources into the frame 2, the smooth projections 10 of the lamp reflector 7 will first contact the frame 2, and while the lamp units 1 are sliding through the frame 2, the end portions 7a of the lamp reflector 7 will be inserted without contacting the frame 2, with being remote by at least the predetermined clearance $C_3$ (refer to FIG. 4(a)). The same applies when taking the lamp units out from the frame 2 in case of performing exchange or repair of the lamp units.

When making the lamp reflector 7 contact (conduct) with the frame 2 in FIG. 4, it is possible to provide a backlight assembly for a liquid crystal display device including a small number of component parts and further requiring few operating steps by making the projections 10 contact the frame 2 without screwing.

When forming at least tip ends of the projections 10 in a rounded manner, sliding resistance with respect to the frame 2 can be made small.

In case of providing the projections 10, it is possible to easily obtain the projections 10 without increasing the number of component parts when integrally forming them with the lamp reflector 7 through drawing of the lamp reflector 7.

Embodiment 3

Figure 5A:
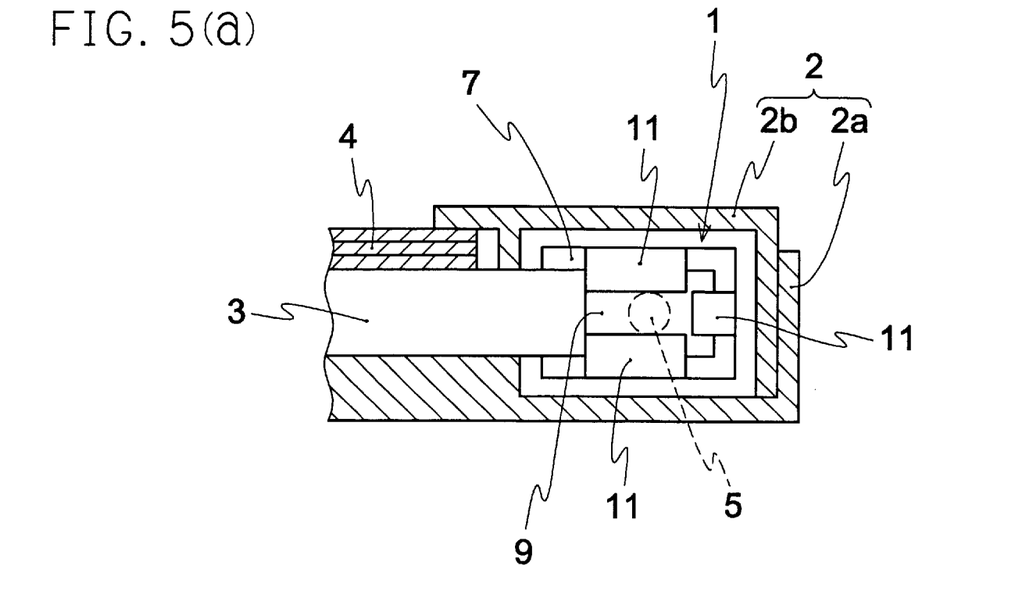
FIG. 5(a) is a sectional view and FIG. 5(b) is a perspective view including partially omitted portions, each showing a backlight assembly for a liquid crystal display device according to Embodiment 3 of the present invention.
Figure 5B:
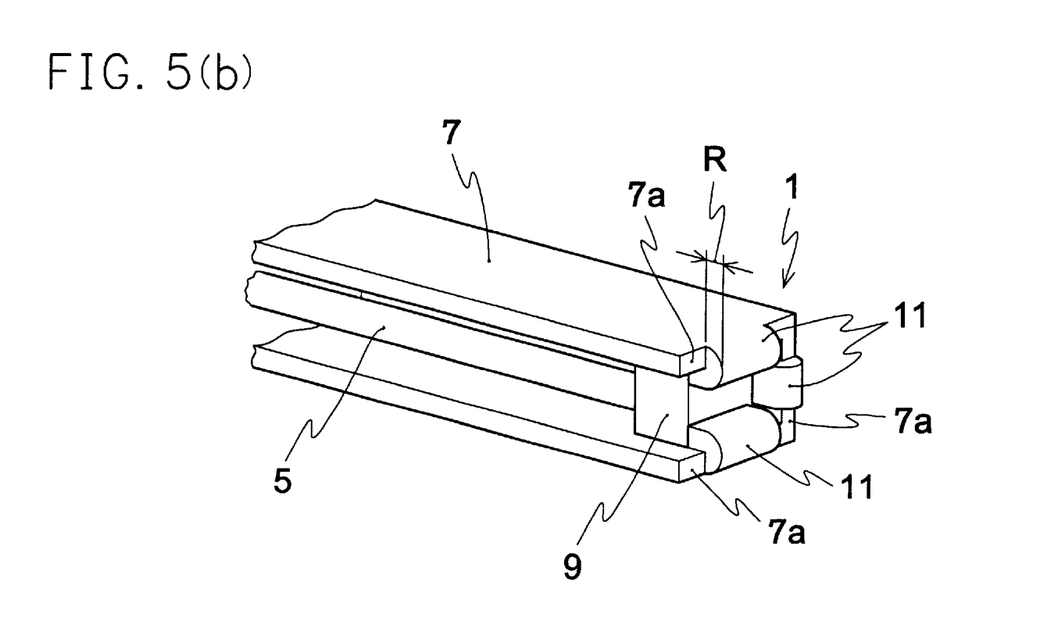
Figure 6:
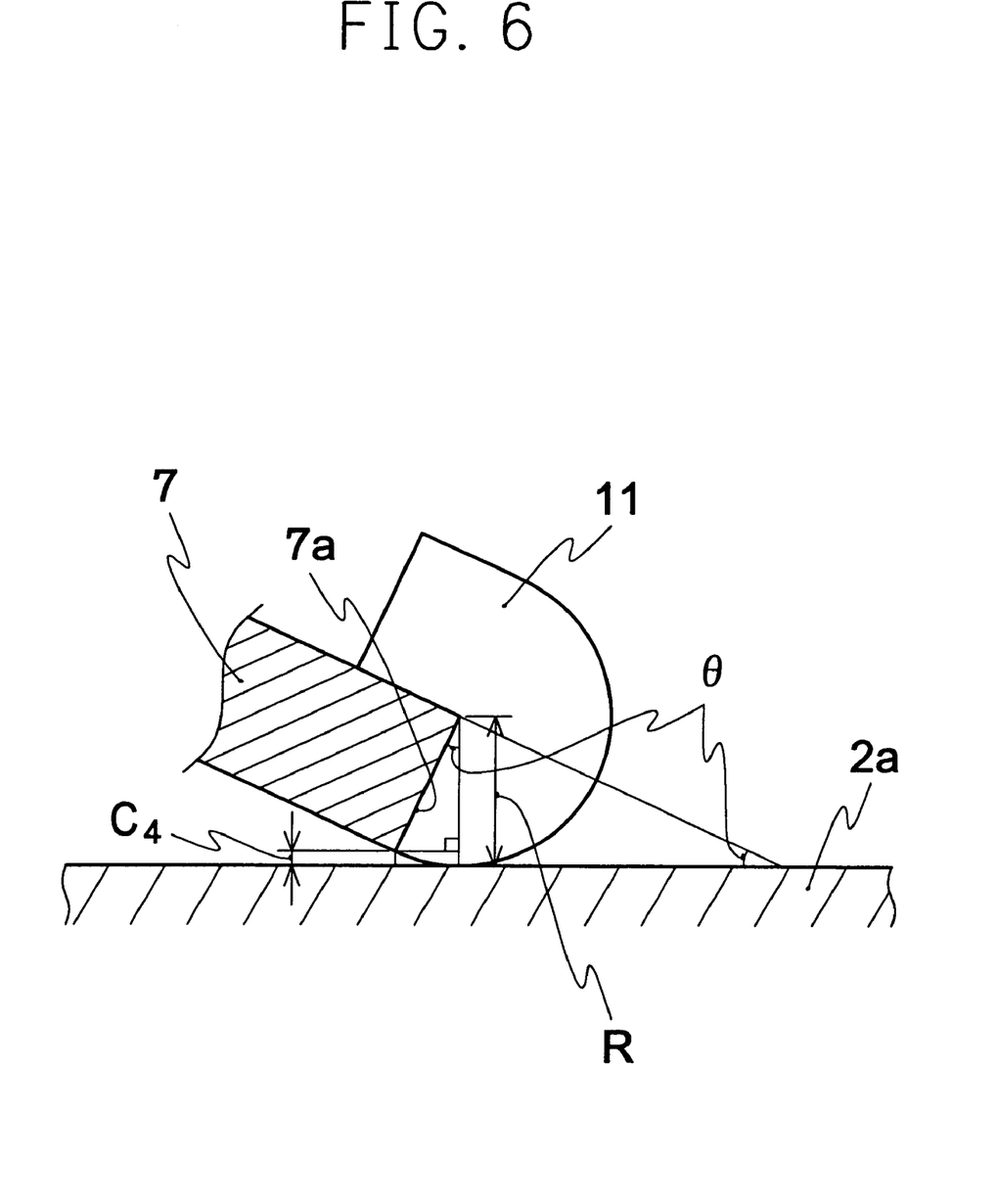
FIG. 6 is a partially enlarged view showing a lamp unit of FIG. 5 during sliding.
Figure 7A:
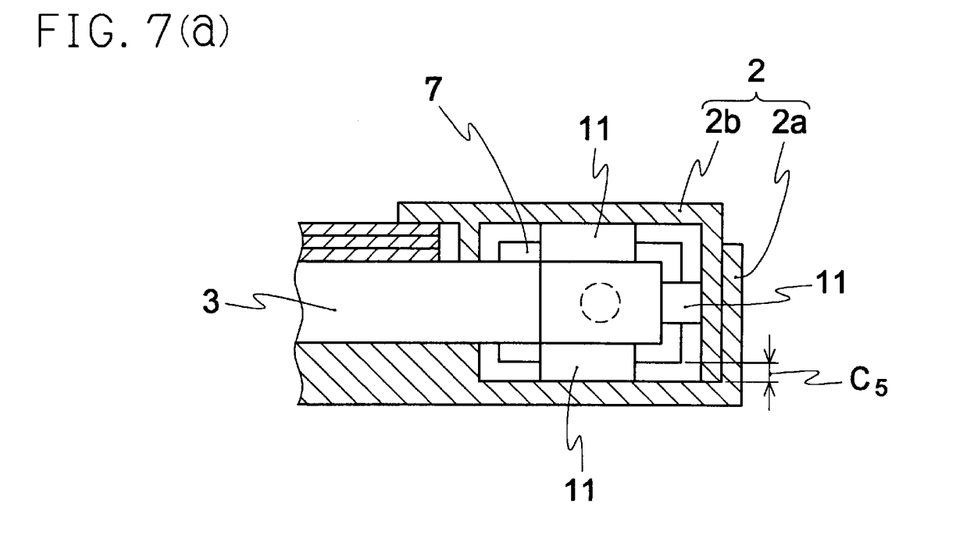
Figure 7B:
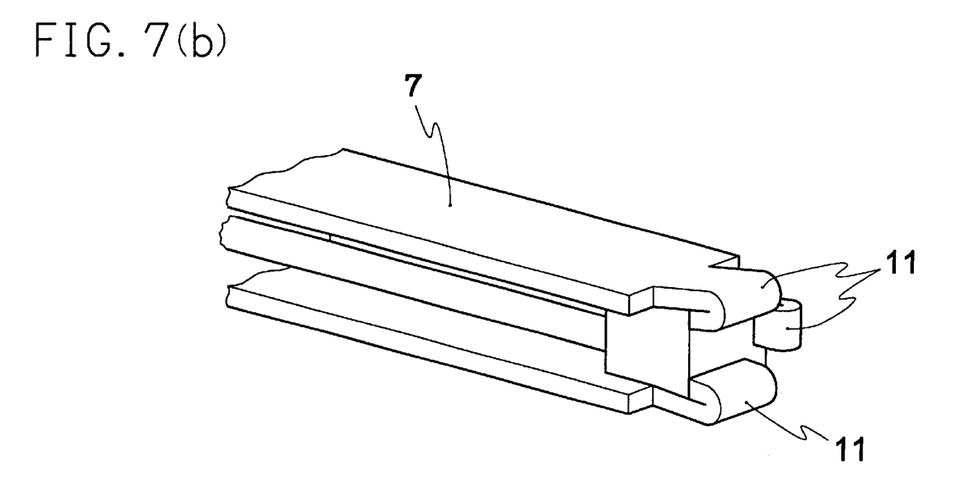

FIG. 5(a) is a sectional view and FIG. 5(b) is a perspective view including partially omitted portions, each showing a backlight assembly for a liquid crystal display device according to Embodiment 3 of the present invention. FIG. 6 is a partially enlarged view showing a lamp unit of FIG. 5 when sliding, and FIG. 7(a) is a sectional view and FIG. 7(b) is a perspective view including partially omitted portions, each showing another example of a backlight assembly for a liquid crystal display device according to Embodiment 3. It should be noted that in FIG. 6, the clearance $C_4$ is shown in an exaggerated manner as it actually is for ease of understanding.

By folding back the end portions 7a of the lamp reflector 7 inward (to the lamp portion 5 side) as shown in FIGS. 5 and 6, it is possible to achieve effects similar to the above-described ones by eliminating contact between the end portions 7a of the lamp reflector 7 and the frame 2.

More particularly, the backlight assembly for a liquid crystal display device according to the present Embodiment 3 comprises, as shown in FIGS. 5 and 6, lamp units 1 including a lamp reflector 7, a lamp portion 5 such as a cold-cathode fluorescent lamp attached within the lamp reflector 7, and lamp rubbers 9 provided on both ends of the lamp portion 5. The lamp units 1 are formed with portions 11 projecting in axial directions of the lamp reflector 7 obtained by extending the end portions 7a of the lamp reflector 7 in axial directions and folding back these portions inward for maintaining a predetermined clearance $C_4$ between at least end portions 7a of the lamp units 1 and the frame 2. The remaining arrangements are similar to those of the above-described backlight assembly of FIG. 2.

When inserting the lamp units 1 into the frame 2, the lamp units 1 are usually inserted by being slightly inclined with respect to the frame main body 2a of the frame 2. In view of this fact, the end portions 7a of the lamp reflector 7 of the present embodiment are provided with substantially semi-circular folded-back portions 11 projecting in axial directions of the lamp reflector 7.

The predetermined clearance $C_4$ between the end portions 7a of the lamp reflector 7 and the frame main body 2a might be given by $C_4 = R \times (1 - \cos \theta)$ wherein R is a radius of the folded-back portions 11 (equal to plate thickness of the lamp reflector 7) and θ is an inclination angle of the lamp reflector 7 with respect to the frame main body 2a.

Thus, when inserting the lamp units 1 which serve as light sources into the frame 2, the folded-back portions 11 of the end portions 7a of the lamp reflector 7 which underwent bending processes will first contact the frame 2, and while the lamp units 1 are sliding through the frame 2, the end portions 7a of the lamp reflector 7 will be inserted without contacting the frame 2, with being remote by at least the predetermined clearance $C_4$ (refer to FIG. 5(a) and FIG. 6). The same applies when taking the lamp units out from the frame when performing exchange or repair of the lamp units.

According to the arrangement shown in FIGS. 5 and 6, the predetermined clearance $C_4$ between the lamp units 1 and the frame 2 will be maintained when the lamp units 1 slide on the frame 2 for supporting these lamp units 1, and the end portions 7a of the lamp reflector 7 will be prevented from contacting the frame 2, and it is thus possible to provide a backlight assembly for a liquid crystal display device capable of preventing generation of foreign matters and further preventing deformations in the lamp units and the frame.

While the lamp units 1 of the present Embodiment 3 are supported within the frame 2 by pinching open end portions of the lamp reflector 7 to both surfaces of the light-conducting plate 3, the present invention is not limited to this arrangement, and it is alternatively possible to set an amount of projection of the folded-back portions 11 large such that no clearance is formed between the folded-back portions 11 of the lamp reflector 7 and the frame 2 and by slightly bending these in outward directions as shown in FIGS. 7(a) and (b) for making the folded-back portions 11 contact the frame 2, and support might be provided by the folded-back portions 11 accordingly.

In such case, the lamp reflector 7 and the frame 2 will be even better prevented from contacting each other since a clearance $C_5$ might be secured to be larger than compared in FIG. 5(a), and assembly and exchange of lamp units can be performed in an easy manner.

According to the present invention, it is possible to easily perform assembly and exchange of lamp units and to further achieve improvements in reliability.

What is claimed is:

1. A backlight assembly for a liquid crystal display device comprising lamp units each including a lamp reflector, a lamp portion attached within the lamp reflector and lamp rubbers provided on both ends of the lamp portion, and a frame for holding the lamp units, wherein the lamp units are arranged to include means for maintaining a predetermined clearance between at least end portions of the lamp units and the frame.

2. The backlight assembly of claim 1, wherein the predetermined clearance is approximately 0.1 to 10 mm.

3. The backlight assembly of any one of claims 1 and 2, wherein a part of the lamp rubbers of the lamp units projects outward from the end portions of the lamp reflector along axial directions of the lamp reflector and a part of the projecting portions projects out from an outer peripheral surface of the lamp reflector.

4. The backlight assembly of claim 1, wherein at least one projection is formed on the outer peripheral surface of the lamp reflector.

5. The backlight assembly of claim 4, wherein at least a tip end of the projection is formed in a rounded manner.

6. The backlight assembly of any one of claims 4 and 5, wherein the projection is formed by drawing the lamp reflector.

7. The backlight assembly of claim 1, wherein portions which project in the axial direction of the lamp reflector and of which tip ends are folded back inward of the lamp reflector are formed at end portions of the lamp reflector.

* * * * *